US005450226A

United States Patent [19]

Khan et al.

[11] Patent Number: 5,450,226
[45] Date of Patent: Sep. 12, 1995

[54] INTER-CAR OPTICAL COUPLING

[75] Inventors: Jehanzeb H. Khan; Michael E. Stagg; Anthony Zakel; Hassan A. Fazli, all of Hornell, N.Y.

[73] Assignee: Morrison Knudsen Corporation, Boise, Id.

[21] Appl. No.: 10,748

[22] Filed: Jan. 29, 1993

[51] Int. Cl.⁶ .............................. H04B 10/00
[52] U.S. Cl. .................. 359/152; 359/159; 246/166.1
[58] Field of Search ............ 359/152, 153, 159, 143, 359/172, 173, 182, 115; 246/166.1

[56] References Cited

U.S. PATENT DOCUMENTS 4,236,255 11/1980 Burgener et al. ............... 359/143
4,313,228 1/1982 Berstein ........................ 359/182
4,682,144 7/1987 Ochiai et al. .................. 246/166.1

FOREIGN PATENT DOCUMENTS 1227954 4/1986 U.S.S.R. ............... G01B 21/16

Primary Examiner—Richard E. Chilcot, Jr.
Assistant Examiner—Rafael Balares
Attorney, Agent, or Firm—Raymond N. Baker; Shanley and Baker

[57] ABSTRACT

Apparatus enabling electrically-isolated transfer of signal data between rail cars connected in tandem in the direction of intended travel. Cable-free space is established between optical transmitter and optical receiver means enabling automatic optical coupling and decoupling. Means are provided to maintain signal intensity and accuracy of signal data transfer notwithstanding changes in alignment and spacing between transmitters and receivers during rail guided travel.

10 Claims, 5 Drawing Sheets

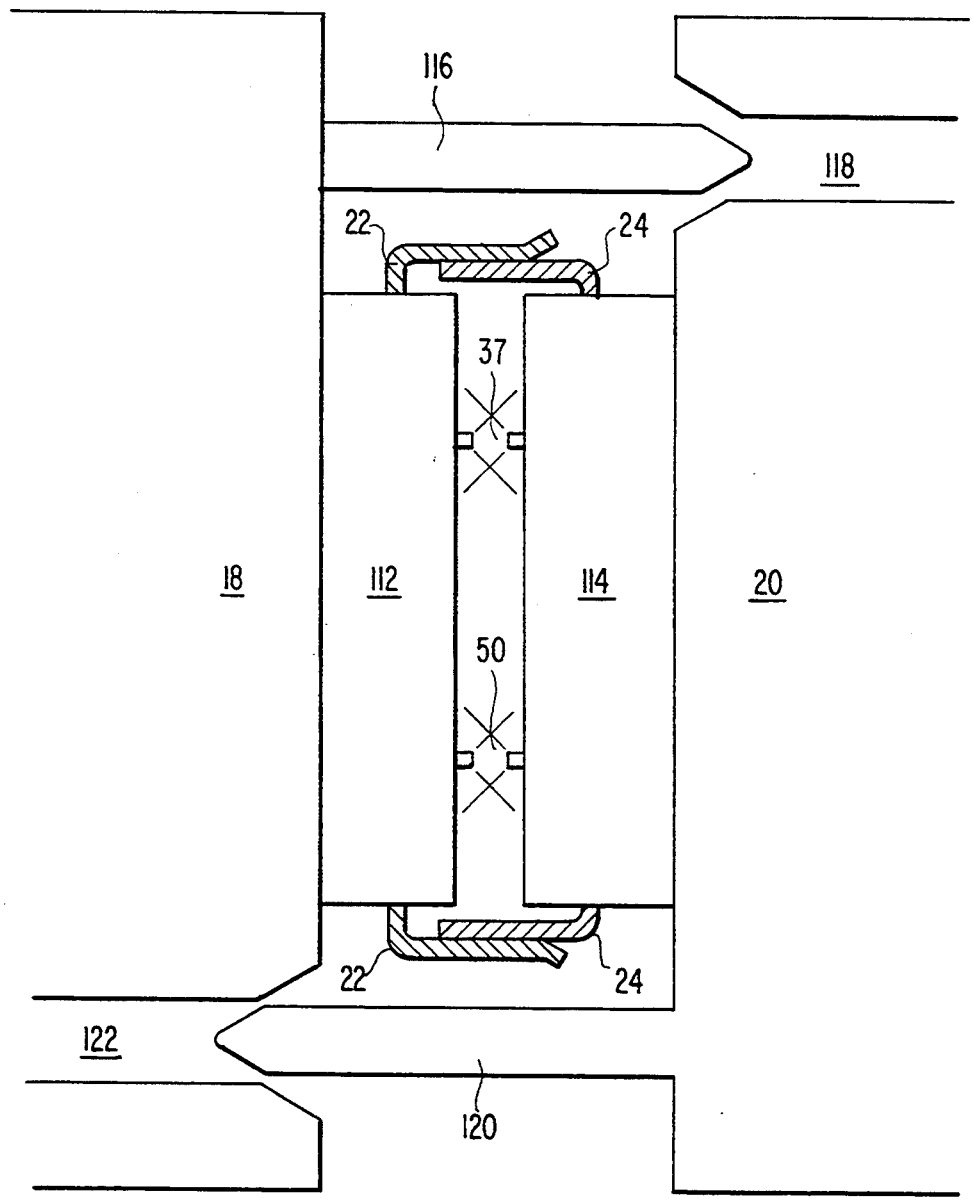

INTER-CAR OPTICAL COUPLING

This invention relates to transfer of signal data by electrically-isolated coupling between vehicles connected in tandem in the direction of the intended travel.

SUMMARY OF THE INVENTION

In its more specific aspects, this invention is concerned with enabling inter-car optical coupling by establishing a cable-free space which is located intermediate a pair of cars for optical transfer of data. And, more particularly, the invention is concerned with automatic optical coupling between vehicles which optimizes data transfer notwithstanding changes in alignment and spacing due to tandem-guided travel of interconnected cars, for example, by rail.

In practice, signals between cars operated in tandem have been carried by copper cables electrically connected by means of bayonet/sheath type of connectors which are located intermediate longitudinal ends of the cars. In that method, induced Electro-Magnetic Interference (EMI) can result in spurious signals between cars and other detrimental factors have been associated with such copper connector practice.

The present teachings facilitate signal transfer between vehicles operated in tandem by apparatus combinations which enable automatic optical coupling. Advantages and contributions of the invention are set forth in more detail with references to the accompanying drawings; in which:

BRIEF DESCRIPTION OF THE DRAWINGS

FIG. 8 is a horizontally-oriented schematic cross-sectional view of the apparatus of FIG. 7 in which the cars are connected in tandem.

Figure 1:
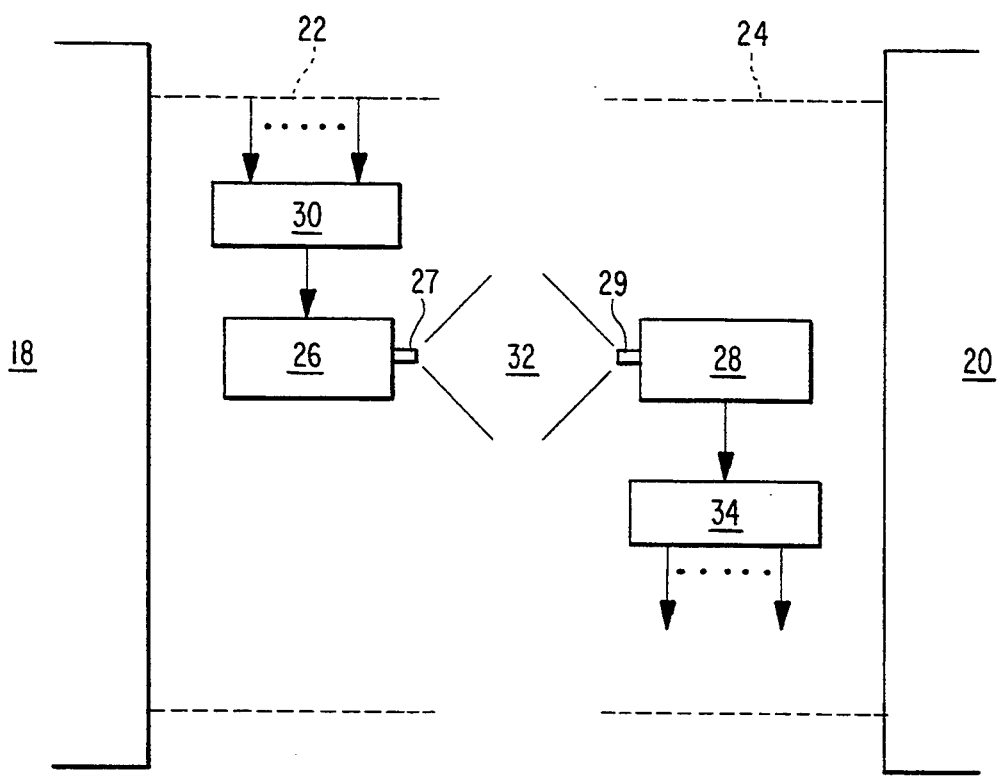
FIG. 1 is a schematic presentation for describing a multi-mode multi-frequency signal system means on opposite sides of an enclosed cable-free space provided by the invention for optical coupling of cars in tandem.

Threaded housings (such as those shown in U.S. Pat. No. 4,884,861 dated Dec. 5, 1989), which act as manual connectors for bringing fiber optic cables into substantial contact and for fixing substantially direct alignment of the centerlines of the cables, have existed in various commercial forms for some time. Flexible fiber optic cables have similarly been available commercially.

DETAILED DESCRIPTION

However, combining such a rigid connector with flexible fiber optic cables has not been taught, as far as is known, for use intermediate the longitudinal ends of tandem-operated rail cars. Recognition of inherent problems and hazards in making such manual connections contributed to seeking other solutions and making discoveries set forth herein for enabling automatic optical coupling at a location intermediate cars as mechanically connected in tandem.

No provision previously existed for automatic coupling for electrically-isolated signal data transmission between rail cars connected in tandem. This invention teaches use of an emitter-detector inter-car system for handling multi-mode (analog and digital) and multi-frequency types of signal data while enabling automatic optical coupling and accurate signal data transfer notwithstanding changes in alignment of and spacing between emitters and detectors which can occur due to rail-guided travel in tandem.

The present teachings combine optical, electrical, and mechanical methods and means to provide a system capable of high data transmitting and receiving rates, as well as automatic optical coupling and decoupling, with signal data transfer occurring across cable-free space at a location intermediate the cars as connected in tandem for travel. The resulting combinations enable accurate signal data transfer while accommodating departures from direct alignment and rigid interconnection, during rail-guided travel in tandem, by controllably establishing a cable-free space located intermediate a pair of cars for signal data transfer between such cars.

Optical and electrical aspects are discussed generally in relation to FIGS. 1 and 2 with more specific aspects of the above contributions being set forth in more detail in relation to later figures. The present system operates across cable-free space between high speed transmitting and receiving means. And, the optical transmitters and detectors are not integrally interlocked mechanically to each other in a manner which would establish a fixed positional relationship between transmitter and detector. But, rather, the invention provides for relative movement between the two.

Signal data from a first car is transmitted optically to a receiving mechanism located on a contiguous second car mechanically connected for travel in tandem. Photo-emitter transmission and photodetector receiving mechanisms for each car provide for bi-directional flow of data via cables in each car. Additionally, features of the invention, set forth later, enable bi-directional flow of data between cars wherein each car utilizes only a single cable.

A cable-free space is formed and enclosed intermediate the cars between such optical transmitting and optical receiving mechanisms. For rail transit car purposes, it is important to be able to combine the optical coupling and free-space concepts for use with existing transit car systems as well as new transit car systems. Signals on existing copper wire trainlines can include, e.g., audio channels, usually at least three for music and one for voice; and, also include forty-five (45) trainline channels for communication and control which normally comprise on/off signals. One of the objectives of the present invention is to enable expansion of such capacity to include video signals and to include communication of more elaborate analytical/diagnostic data than presently employed. The relationship of such capacity to selection of bit rate and other functions comprise part of the invention's concepts.

The schematic presentation of FIG. 1 relates to accommodation of multi-mode (analog and digital) and multi-frequency signal data. Car 18 and car 20 each schematically present a partial encasement 22,24, respectively, for forming a cable-free channel between transmitter mechanism 26 (with shutter means 27) and receiver mechanism 28 (with shutter means 29). Selection of a signal bandwidth by pulse coded modulation and selection of a dependent bit rate of transmission are coordinated to provide for an acceptable signal to noise ratio and an acceptable bit error rate for the receiver. A suitable system taught herein would comprise a bandwidth of one MHz, a bit rate of transmission above about ten to about twenty Mbit/sec., a fractional bit error rate ($10^{-9}$) and a signal to noise quality of about thirty-five dB; ("bit error rate" and "noise quality" as used herein are defined in: *Understanding Fiber Optics*, J. Hecht, published by Howard W. Sams & Company, Indianapolis, Ind. 46268, copyright 1987, pages 130–131).

Multiplexer 30 encodes signals from multiple signal paths into a single signal path for optical transfer through cable-free space 32 to receiver 28 for demultiplexing at 34 for relaunching through multiple paths as required for car 20. Electrical and optical conversion(s) can be used on each side of the optical path extending between receiver and transmitter. Also, a multiplexer and demultiplexer can be used on either side of the cable-free space dependent on signal direction even though only one path and direction is shown in FIG. 1.

In practice, a transmitter and receiver are required for each car for bi-directional flow of information. The transmitter can be a laser diode or an LED operable within a selected frequency range and capable of being modulated within a selected data transmission (bit rate) range. Suitable optical transmitters are available commercially from manufacturers such as Amp, Inc., Hewlett-Packard or Motorola, Inc. The receiver can be a "light" sensitive semi-conductor, preferably an avalanche photodiode (with built-in gain), available from such previously identified manufacturers and responsive to the transmitted "light" of the type described above. The multiplexer and demultiplexer connectors are shown schematically. In practice, signal conversion and/or reconversion means and multiplexer/demultiplexer means can be located anywhere along the cable for each car, but preferably closer to the source of signals within each respective car.

The separable partial encasement means 22,24 combine to completely enclose the desired channel of cable-free space between transmitters and receivers. The interfitted partial encasement means 22,24 can also enclose associated components, such as amplifier, converter, and/or drive means, as desired.

In addition, each transmitter and receiver can include a protective shielding arrangement in the form of an automatically operable shutter, indicated schematically at 27,29 in FIG. 1, covering at least the apertures of the transmitter and receiver. Such shutter means 27,29 can, for example, be automatically opened when cars are being mechanically connected for guided travel in tandem.

Where practical, like parts, such as transmitter means and receiver means, are designated with like reference numbers in the following figures. Each car has a transmitter and a receiver means for bi-directional flow of signal data. The encasement of cable-free space, as shown schematically in FIG. 1, facilitates accurate transfer of signal data between cars in tandem. FIGS. 2 and 3 provide an indication of the scope of changes of alignment and spacing which can occur with rail-guided travel of cars mechanically-connected in tandem. The objectives of the invention are to maintain accuracy of signal data transfer notwithstanding such changes. While such changes could be partially moderated by mechanical means, in order to achieve automatic coupling and other features of the invention, significant changes in alignment and spacing are to be accommodated as more specifically described herein.

Figure 2:
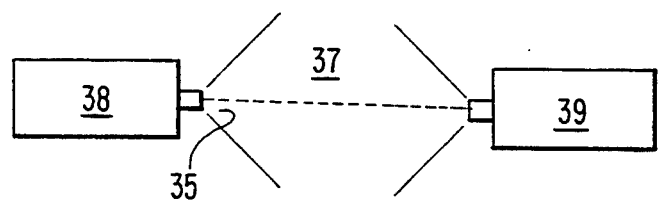
FIGS. 2 and 3 are schematic views of optical coupling means for describing the effects of changing alignment and spacing on signal intensity and signal detection in accordance with the invention.
Figure 4:
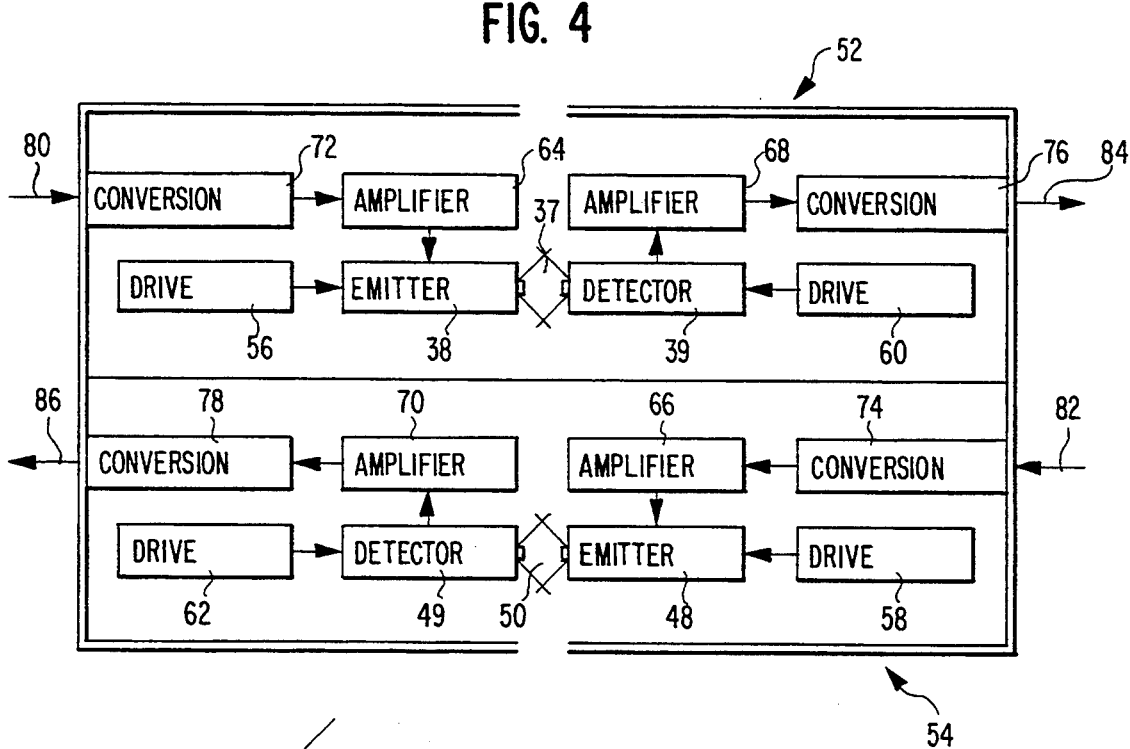
FIG. 4 is a schematic presentation of a preferred embodiment of the invention, referred to as an "active" coupler.
Figure 3:
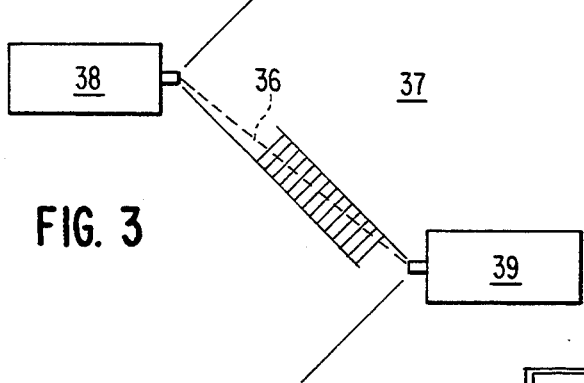

The "active" coupling apparatus of FIG. 4, modifies signal intensity modifications enabling accurate transfer of signal data notwithstanding the effects of changes in alignment and spacing depicted by comparing FIGS. 2 and 3. The "passive" system of FIG. 5, without the active components, can work effectively for applications in which the direct alignment and spacing, indicated by FIG. 2, is substantially maintained by rectilinear guided travel. The differences between FIGS. 2 and, 3 enable visualizing changes in alignment and spacing which can be effectively accommodated through use of optical transmitters and receivers as taught by the invention and relying on respective emitting and detecting areas.

With fiber optic connectors, only limited deviation (within a few degrees) from complete alignment of the axes of the cables can be tolerated. Enclosing a cable-free space without requiring integrally interlocking the partial encasement of each car, enables a deviation from the direct alignment axis 35 (shown by interrupted line in FIG. 2) along a linearly extended axis 36 (shown by interrupted line in FIG. 3) within cable-free space 37 between transmitter 38 and receiver 39.

Relative movement in one plane, e.g. horitzontal, is indicated by the translated locations of transmitter 38 and receiver 39 in FIG. 3. Transmitter 38 and receiver 39 provide accuracy of data transfer notwithstanding that the signal can be weakened in accordance with the inverse square law (because of the increased length travel path indicated by FIG. 3) and, also, because of a decrease in signal strength because of the angular deviation from the optical center of the emission source. That is, weakened signals, as received at the photodetector, can be amplified through use of "active" coupling as shown in FIG. 4. Amplification brings the signal level up without requiring reshaping. Movement in a vertical plane can be accommodated similarly, to that shown horizontally, as needed by the guided travel. The semiconductor emits light at an angle of about 10° to about 20°; with emitting and receiving overlap providing a range of operability (as shown by FIGS. 2 and 3) which is suitable for curved-path travel used for rail transit cars. The linear spacing between transmitter and receiver has a minimum practical dimension (35 of FIG. 2) for automatic coupling rail transit cars of about one to two and one-half inches; and, an extended length dimension of about seven and one-half to about ten inches (along axis 36 of FIG. 3).

FIG. 4 provides a schematic representation of an "active" coupling system for optical transfer of signal data, bi-directionally, in which a separate cable is used in each car for each direction. Optical transmitting means 38 and receiving means 39 operate across a cable free space 37. The transmitting means 38 and receiving means 39 provide for transmission in one direction between cars, while the transmitting means 48 and receiving means 49 provide for transmission in the opposite direction between cars across cable-free space 50. The single-direction combined unit using transmitter 38 and receiver 39 is designated as transceiver 52 while the remaining single direction combined unit is designated as transceiver 54.

Drive circuitry means 56 and 58 are used to provide suitable electrical current to transmitting means 38 and 48, respectively; and, drive circuitry means 60 and 62 are used to provide bias voltage and stability to receiving means 39 and 49, respectively. Amplifier means 64 and 66 are used to compensate for signal intensity loss, from the source along the cable or loss during conversion; and, amplifier output is used to modulate the drive current to the transmitting means for generating the signal data in optical form. Amplifier means 68 and 70 are provided to receive the electrical signal output from receiving means 39 and 49 and to amplify such electrical signal output. Conversion of signal data for transceivers 52 and 54 between electrical and optical forms is provided as required. The use of optical signals on cables 80,82,84 and/or 86 requires conversion circuitry for each such cable. The use of electrical signals on any such cable would obviate the need for conversion circuitry for that cable.

Figure 5:
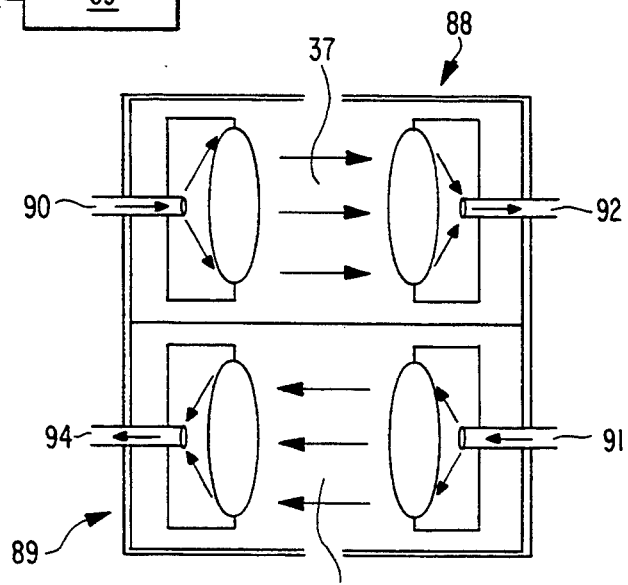
FIG. 5 is a schematic presentation of another embodiment of the invention, referred to as a "passive" coupler, having certain advantages for more limited applications in tandem car operations than those of the embodiment of FIG. 4.

In FIG. 5, a passive coupling scheme is depicted with transceivers 88 and 89 formed by using lens assemblies designed specifically for the optical parameters and physical dimensions of the coupler. Unlike the active coupling system of FIG. 4, optical transmission is relied on without augmentation. The embodiment of FIG. 5 finds application in rectilinear tandem travel, such as intra-airport transit systems, where relative movement (changing alignment or spacing) is significantly less of a factor, as compared to urban rapid transit rail systems. Advantages of such passive coupling system, notwithstanding possible more limited application, lie in the elimination of power and support circuitry required. The passive coupler, as shown, comprises an optical assembly which requires no regenerative (conversion) or signal amplifying means.

Figure 6:
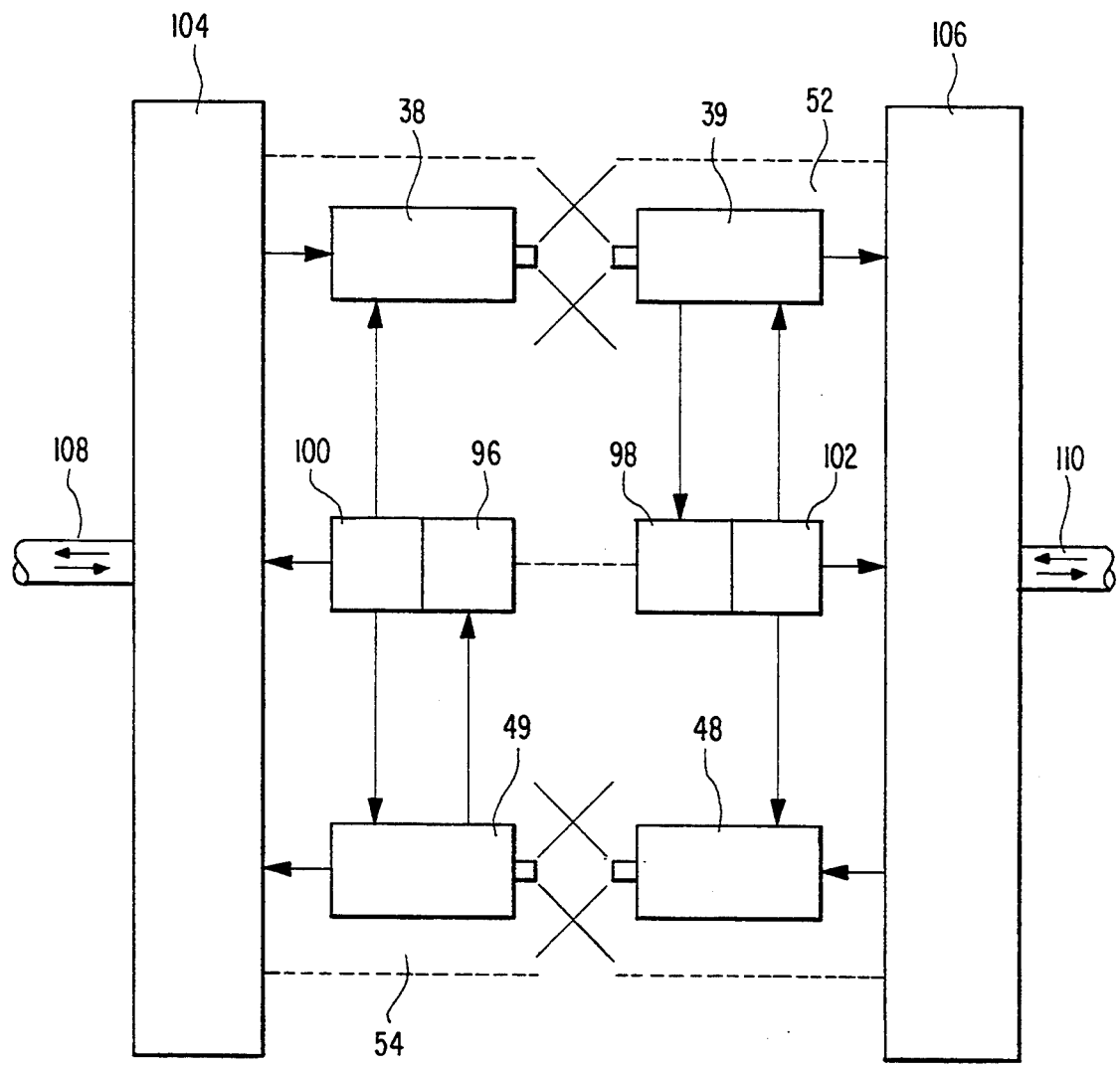
FIG. 6 is a schematic view for describing features of an embodiment of the invention utilizing a single input-/output cable per car while enabling optical coupling for bi-directional flow of signal data between cars.

FIG. 6 depicts another active coupler embodiment wherein transceivers 52 and 54 share additional control components 96, 98,100 and 102; for example, for initially detecting a coded signal from either transmitter 38 or 48. Such coded signal is received by receiver 39 or 49, respectively, converted to an electrical signal and interpreted by detector means 96 or 98, respectively, to cause the switching, for bi-directional capability purposes, by disabling transmitter 48 and enabling transmitter 38 for one direction; or, by disabling transmitter 38 and enabling transmitter 48, for a signal in the opposite direction. Transceiver circuit blocks 104 and 106 can provide for sharing single amplifying and/or energy conversion means, so that a single data cable 108, 110, respectively, in each car can be relied on for bi-directional signal data flow; and, used as an input or output cable for the transceiver means dependent on direction of the signal data flow. Another embodiment for use of a single cable in each car could utilize optical branching means in the transceiver blocks 104 and 106. Selecting an optical branch to transmitter 38 or 48, and an optical branch to receiver 39 or 49, could eliminate the need for sensing signal direction and control circuits 96, 98, 100 and 102 of FIG. 6; however, drive circuits for the photo elements would be retained.

Figure 7:
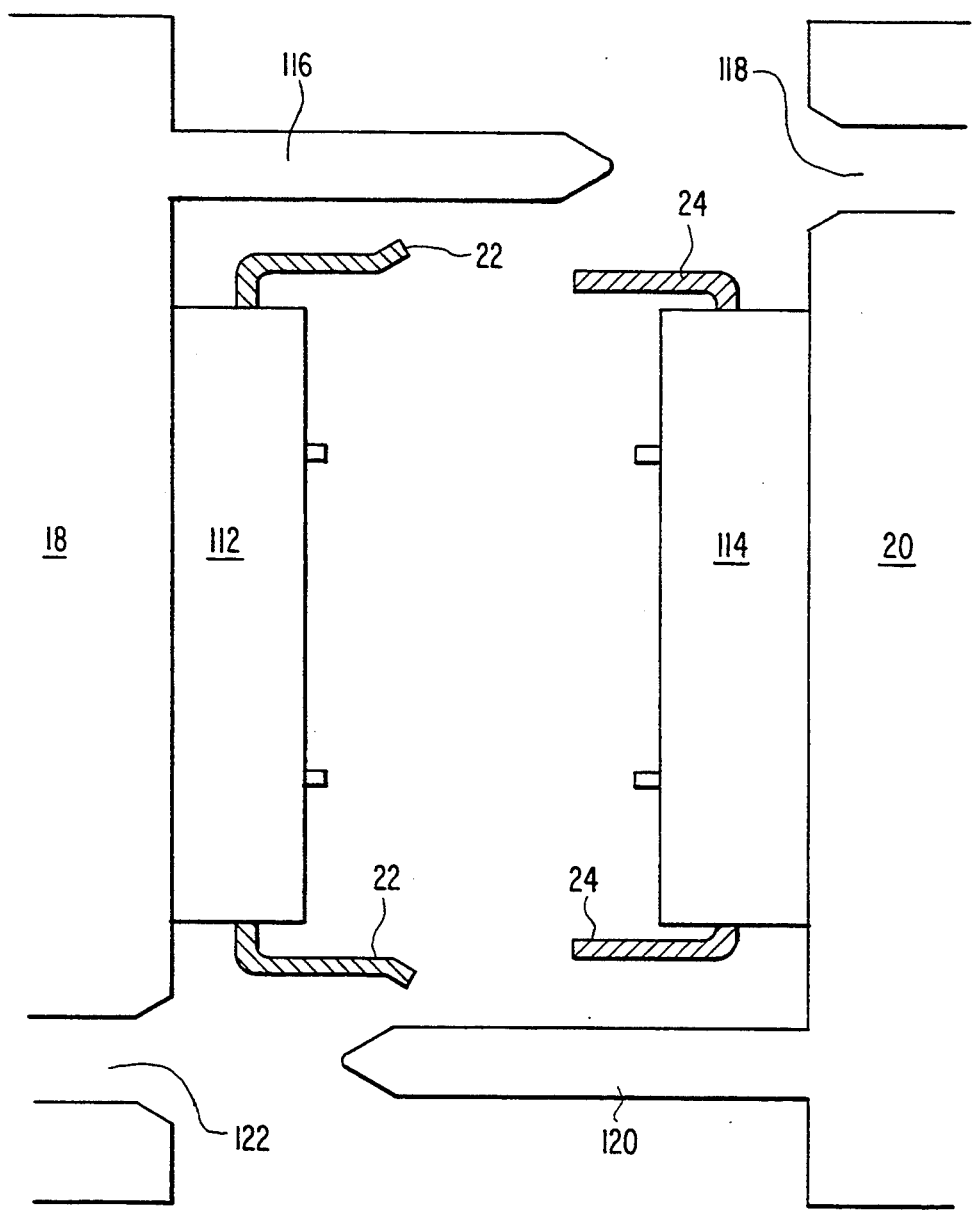
FIG. 7 is a horizontally-oriented schematic cross-sectional view, of apparatus for providing automatic signal data transfer coupling of the invention, in a stage approaching mechanical alignment and interconnecting a pair of cars for guided travel in tandem.

The above electro-optical means provide for changes in alignment and spacing due to relative movement between transmitter and the receiver means. FIGS. 7 and 8 schematically present mechanical alignment/connector means suitable for the above-described types of automatic optical coupling systems. FIG. 7 depicts the stage approaching mechanical alignment and connection of a pair of cars; and, FIG. 8 schematically shows the mechanical connected and optical coupled stage.

Mechanical car alignment and connecting means, with coacting male and female means 116,118 and 120,122 coact as shown in FIGS. 7 and 8. Suitable mechanical alignment and mechanical connecting means for rail cars to carry out the coaction, as schematically shown, are available commercially.

A component housing means 112, 114, shown enlarged for purposes of describing the embodiment in FIGS. 7,8, can be used for housing active components for operation of, and for supporting, the optical transmitters and receivers of earlier described transceivers 52,54, within the cable-free space intermediate the cars. Car alignment means 116,120 provide suitable alignment for interfitting of partial encasement means 22 and 24. Such partial encasement means on each car interfit to completely enclose the cable-free channel(s), such as 37,50, shown in FIG. 8. Operation of such alignment means can activate opening of the protective shutter means for the optical transmitting and receiving means.

When the two cars are coupled, as shown in FIG. 8, the partial encasement means 22,24 completely enclose (forming a light blocking shroud about) the cable-free space (37,50); all or a portion of the active coupling components or the housings 112 and 114 can also be enclosed, as desired. The encasement means 22,24 further include a non-reflective (light-absorbing) coating on all portions of the inner surface of the enclosure which could be exposed to the optical signal transfer "light" so as to reduce or eliminate unwanted reflected light which could have a deleterious effect on detection accuracy of the transmitted signal across the enclosed cable-free space (37,50). No integral clamping or interlocking means is utilized on the encasement means which would decrease the range of operability, shown by FIGS. 2 and 3, for rail guided travel; and it is preferred that no such clamping or interlocking means be used on the encasement means.

While specific embodiments have been set forth in describing the invention, it should be recognized that the above teachings could be used to devise embodiments and means other than those described; therefore, in determining the scope of the present invention, reference shall be made to the appended claims.

We claim:

1. Apparatus for electrically-isolated transfer of data between at least a pair of contiguous cars to be mechanically interconnected in tandem in the direction of intended travel by combining:
   (A) source means for signal data to be transferred between said pair of cars;
   (B) at least one cable within each car for transfer of signal data within each said car, and
   (C) an inter-car system for automatic electrically-isolated coupling of said at least one cable of each said car, including:
      (i) means associated with said at least one cable of each car for selectively receiving or transmitting signal data to provide for bi-directional transfer of data between said at least one cable of each said pair of cars to be connected in tandem, (ii) partial encasement means on each said car located contiguously to where said cars are to be mechanically interconnected for travel in tandem, the partial encasement means on one said car being in confronting relationship with the partial encasement means on the remaining car of said pair, said partial encasement means for each car being selected to provide for interfitting so as to enclose cable-free space for electrically-isolated transfer signal data between said cars, the partial encasement means for each car being selected to be free of any requirement for integral interlocking means while providing for a circumscribing enclosure and a predetermined relationship permitting a change in alignment and change of spacing between said means for selectively receiving and transmitting signal data, and (iii) mechanical alignment and car interconnecting means providing for said interfitting of said partial encasement means as said pair of cars are mechanically interconnected in tandem.

2. The apparatus of claim 1 in which
the partial encasement means are selected to form said enclosure so as to facilitate accuracy of transfer of signal data by minimizing interference with said electrically-isolated transfer of signal data within said enclosed cable-free space.

3. The apparatus of claim 2 in which
said means for selectively receiving or transmitting signal data in said enclosed cable-free space comprises electro-optical means.

4. The apparatus of claim 3 in which
internal surface means of said cable-free enclosure formed by interfitting said partial encasement means present a surface finish to minimize optical reflection within said space during transfer of signal data.

5. The apparatus of claim 3, further including
conversion means for converting signal data between electrical energy and optic energy forms, and, in which
said conversion means include means to digitize the data when in the electrical energy form either before and/or after converting.

6. The apparatus of claim 5 in which
signal data is digitized within a selected bandwidth, and
optical signal data transmission is carried out at a preselected minimum bit rate.

7. The apparatus of claim 5, in which the conversion means include
multiplexing and demultiplexing means, and
said multiplexing and demultiplexing means are selected to be capable of handling encoding and decoding multiple signal paths for transfer on a single signal path between cars at a preselected minimum bit rate of about 10 to about 20 Mbits/second.

8. The apparatus of claim 3, in which
active component means for effecting signals for said electro-optical transfer are located within said enclosure of cable-free space formed by interfitting of said partial encasement means; and further including:
housing means for encapsulating said active component means, in which
external surface means of said housing means present a surface finish so as to minimize optical reflective interference with accurate transfer of signal data across said cable-free optical coupling.

9. The apparatus of claim 5, further including
protective means operable as a shutter for protecting transmitting and detecting portions of said electro-optic means.

10. The apparatus of claim 9, in which
said protective means operate as a shutter responsive to operation of said mechanical alignment and car interconnecting means.

* * * * *